United States Patent [19]

Sperber

[11] 4,446,407

[45] May 1, 1984

[54] ANTENNA ROTATOR APPARATUS

[75] Inventor: Martin Sperber, Santa Monica, Calif.

[73] Assignee: Intercept Corporation, Clifton, N.J.

[21] Appl. No.: 355,401

[22] Filed: Mar. 8, 1982

[51] Int. Cl.³ .............................................. G05B 1/06
[52] U.S. Cl. .................................... 318/282; 318/663
[58] Field of Search ............... 318/663, 665, 664, 667, 318/673, 674, 490, 282, 489, 466, 468; 343/757, 766

[56] References Cited

U.S. PATENT DOCUMENTS

| Re. 26,404 | 6/1968 | Lunn et al. | 318/29 |
|---|---|---|---|
| 1,918,180 | 7/1933 | Carter . | |
| 2,248,335 | 7/1941 | Burkhart | 250/11 |
| 2,264,850 | 12/1941 | Koch | 250/11 |
| 2,272,431 | 2/1942 | Rankin | 250/11 |
| 2,292,791 | 8/1942 | Mims | 250/33 |
| 2,476,469 | 7/1949 | Walker | 250/33 |
| 2,481,331 | 9/1949 | Newbold | 343/100 |
| 2,498,957 | 2/1950 | Jordan | 318/207 |
| 2,535,850 | 12/1950 | Hammond | 318/490 |
| 2,559,339 | 7/1951 | Blease et al. | 177/327 |
| 2,565,334 | 8/1951 | Weingarden | 343/100 |
| 2,566,897 | 9/1951 | Koenig | 318/267 |
| 2,583,747 | 1/1952 | Potter | 250/33 |
| 2,599,048 | 6/1952 | Dicke | 343/100 |
| 2,642,567 | 6/1953 | Kimball et al. | 343/100 |
| 2,745,994 | 5/1956 | Dicke et al. | 318/18 |
| 2,790,121 | 4/1957 | Martin | 318/33 |
| 2,794,162 | 5/1957 | Lifsey | 318/265 |
| 2,798,190 | 7/1957 | Goodman | 318/31 |
| 2,861,265 | 11/1958 | Deming et al. | 343/766 |
| 2,872,631 | 2/1959 | Blauvelt et al. | 318/28 |
| 3,043,998 | 7/1962 | Lunn et al. | 318/29 |
| 3,102,218 | 8/1963 | Dicke | 318/41 |
| 3,126,506 | 3/1964 | Schneider | 318/28 |
| 3,197,683 | 7/1965 | Bennett et al. | 318/16 |
| 3,248,730 | 4/1966 | Neumeyer | 343/100 |
| 3,297,923 | 1/1967 | Schneider et al. | 318/18 |
| 3,316,469 | 4/1967 | Dicke | 318/41 |
| 3,327,187 | 6/1967 | Schneider et al. | 318/29 |
| 3,329,945 | 7/1967 | Deming | 340/187 |
| 3,471,760 | 10/1969 | Dicke | 318/41 |
| 3,495,143 | 2/1970 | Deming | 318/18 |
| 3,508,274 | 4/1970 | Kesler et al. | 343/758 |
| 3,667,024 | 5/1972 | Deming | 318/674 |
| 3,796,938 | 3/1974 | Funston | 318/663 |
| 4,028,571 | 6/1977 | Dicke | 310/89 |
| 4,072,886 | 2/1978 | Dammeyer | 318/602 |
| 4,112,343 | 9/1978 | Douglas | 318/674 |
| 4,117,386 | 9/1978 | Cohen et al. | 318/665 |
| 4,118,705 | 10/1978 | Varley | 343/100 |
| 4,131,839 | 12/1978 | Springer | 318/675 |
| 4,263,539 | 4/1981 | Barton | 318/663 |

Primary Examiner—G. Z. Rubinson
Assistant Examiner—Arthur G. Evans
Attorney, Agent, or Firm—Morgan, Finnegan, Pine, Foley & Lee

[57] ABSTRACT

A control circuit for an antenna rotator includes a difference amplifier which develops a motor drive signal of both positive and negative polarity for rotation of a DC motor in both clockwise and counterclockwise directions. A feedback loop circuit for control of the motor is provided by a sensor of antenna position, the sensor being coupled between the antenna and the amplifier. Friction in a gear train coupling the motor to the antenna isolates the circuit from wind induced vibrations of the antenna.

7 Claims, 2 Drawing Figures

ANTENNA ROTATOR APPARATUS

BACKGROUND OF THE INVENTION

This invention relates to antenna rotation, and more particularly to a control circuit using antenna position feedback for driving an antenna rotator.

Radio and television receivers employ antennas for the reception of the broadcast electromagnetic radio and television signals. For home viewing of television programs, as well as listening to FM (frequency modulation) radio programs, the antenna may be placed in the room alongside the receiver, or alternatively, may be mounted on the roof. Roof mounting is preferred for the reception of distant signals since the higher elevation of the antenna increases the strength of the signal which is received.

For further improvement in signal reception, the antenna may be designed for high directivity, as with an array antenna, and oriented so as to point directly at the source of the television (or radio) broadcast. In order to change the orientation of an antenna so as to receive broadcasts emanating from different sites, the antenna is typically mounted on a rotator which, in turn, is secured to the roof. Normally, the rotator is electrically actuated by a control circuit which includes a control panel adjacent to the receiver for allowing the viewer to point the antenna in the desired direction. A person viewing a television program can readily select the desired direction of the antenna by turning a knob on the control panel.

The design of such electrical circuits for the control of antenna rotators is subject to various constraints which create numerous problems, and which impede the design of a circuit which can be commercially acceptable while providing satisfactory operation.

One problem attending the design of an acceptable control circuit is the choosing of a motor to rotate the antenna, i.e., whether an AC (alternating current) motor or a DC (direct current) motor is to be utilized. While a DC motor (which has a permanent magnet rotor) of a given size can provide more torque than an AC motor of comparable size, the brushes of a DC motor produce electrical disturbances (called electrical noise) which are relatively strong when compared to the strength of the electric signals appearing in the solid state circuitry used in televisions and radios (e.g., transistors and integrated microcircuits). As a result, the noise of the brushes may well be strong enough to induce distortion of a television picture or radio broadcast whenever the motor is in operation for rotating the antenna, making it impossible for one to hear the radio broadcast or view the clarity of the television picture being received while simultaneously turning the antenna. Accordingly, it has been the practice to use AC motors which do not have brushes but are, unfortunately, of substantially larger size, larger weight, and more costly.

Further design problems arise in the area of the electrical connection between the antenna rotator drive circuit located at the receiver, and the components of the system located on the roof, adjacent the antenna.

For example, the number of conductors which can be run between a drive circuit and any system components located on the roof is limited to five under a prevailing industry standard. Thus, a multiconductor cable having only five conductors typically provides such connections. The five conductors must carry all necessary power to the motor as well as any other control signals which might be utilized by the circuit in the operation of the rotator.

In connection with this, past circuit designs have failed to use the circuit configuration which it has been found can provide the most accurate positioning of an antenna, i.e., a closed-loop control circuit employing a feedback signal indicating the orientation of the antenna. Since the use of a feedback signal would necessarily require additional electrical conductors in the connecting cable, in addition to those conductors utilized for simply powering the motor, it has been common practice to utilize open-loop control circuitry for positioning antennas. Thus, the industry standard requiring the use of cables having five wires or less has heretofore imited the selection of available circuit configurations.

An additional design problem becomes evident in the implementation of circuits using a multiconductor cable to power a motor and to conduit feedback signals indicating the orientation of an antenna. Here it has been found that a single wire conductor of the cable cannot be used as a common ground return for both the motor power and the feedback signals, since the common ground being lengthy, would serve as a medium of excessive coupling between the input and output terminals of the control circuit, thereby causing the control circuit to become destabilized.

Another problem is the need of any antenna rotator control circuit using a closed-loop drive circuit to differentiate between true feedback signals (indicating a true variation between the selected position of the antenna and its true position) and spurious feedback signals caused by vibratory movements of the antenna due to wind gusts.

Finally, other problems require the circuitry to be designed so as to preclude burn-out of the motor in the event that the antenna is jammed by ice in the winter time, or in the event that the wiring is incorrectly installed, as may occur during installation by an inexperienced person.

SUMMARY OF THE INVENTION

The aforementioned problems are overcome and other advantages are provided by an antenna rotator circuit which, in accordance with the invention, utilizes a feedback loop to indicate the orientation of the antenna. The feedback signals are conducted over the foregoing five-conductor cable from a position sensor mechanically coupled to the antenna to a circuit module located at the television/radio receiver. The position sensor is a potentiometer which utilizes a total of three of the wires of the five-conductor cable. The circuit of the invention also includes a DC motor which is mechanically coupled via a step-down gear train to the antenna. The motor utilizes a total of two wires of the five-conductor cable, thus, the total number of wires used does not exceed the maximum of five conductors available in the standard conductor cable. One conductor of the cable is used for a ground return in the motor power circuit, while a second conductor is used for the ground return from the potentiometer in the antenna position sensing circuit. The use of separate conductors for such ground returns insures that the input and output signals of the drive circuit are adequately decoupled to allow stable operation of the drive circuit. An added measure of protection is provided by filtering located directly at the motor to further attenuate noise induced by the brushes.

In accordance with a further feature of the invention, the step-down gear train is provided with a large gear ratio, i.e., at least 1000:1. In the preferred embodiment of the invention, a gear ratio of 4000:1 is utilized. The purpose of such a large gear ratio is to reduce in magnitude the frictional forces experienced in the rotation of the antenna which are coupled to the motor. In operation, the achievement of this objective causes the frictional forces developed by the motor and within the train itself to result in a frictional torque which is greatly increased by the selected gear ratio, such that when the motor is de-energized the antenna is unable to rotate at all. This gear arrangement eliminates the need to include in the antenna rotator control circuit circuitry which must deal with spurious antenna position feedback signals that would be caused by vibratory movements of the antenna due to wind gusts, since the gear arrangement causes the actual frictional forces seen by the antenna to preclude rotation of the antenna under the influence of the wind. In addition, this gear arrangement causes the feedback loop to be well damped since any tendency of the antenna to overshoot a selected orientation position, by virtue of antenna inertia, is cancelled by the friction of the gear train. Thus, the rotator can be utilized with a variety of antennas while only the inertia of the motor need be considered in the selection of the loop parameters for stable operation of the circuit.

It will be understood that the foregoing general description and the following detailed description as well are exemplary and explanatory of the invention but are not restrictive thereof.

The accompanying drawings, referred to herein and constituting a part hereof, illustrate a preferred embodiment of the invention, and together with the description, serve to explain the principles of the invention.

BRIEF DESCRIPTION OF THE DRAWINGS

The foregoing aspects and other features of the invention are explained in the following description, taken in connection with the accompanying drawings wherein.

DESCRIPTION OF THE PREFERRED EMBODIMENT

Figure 1:
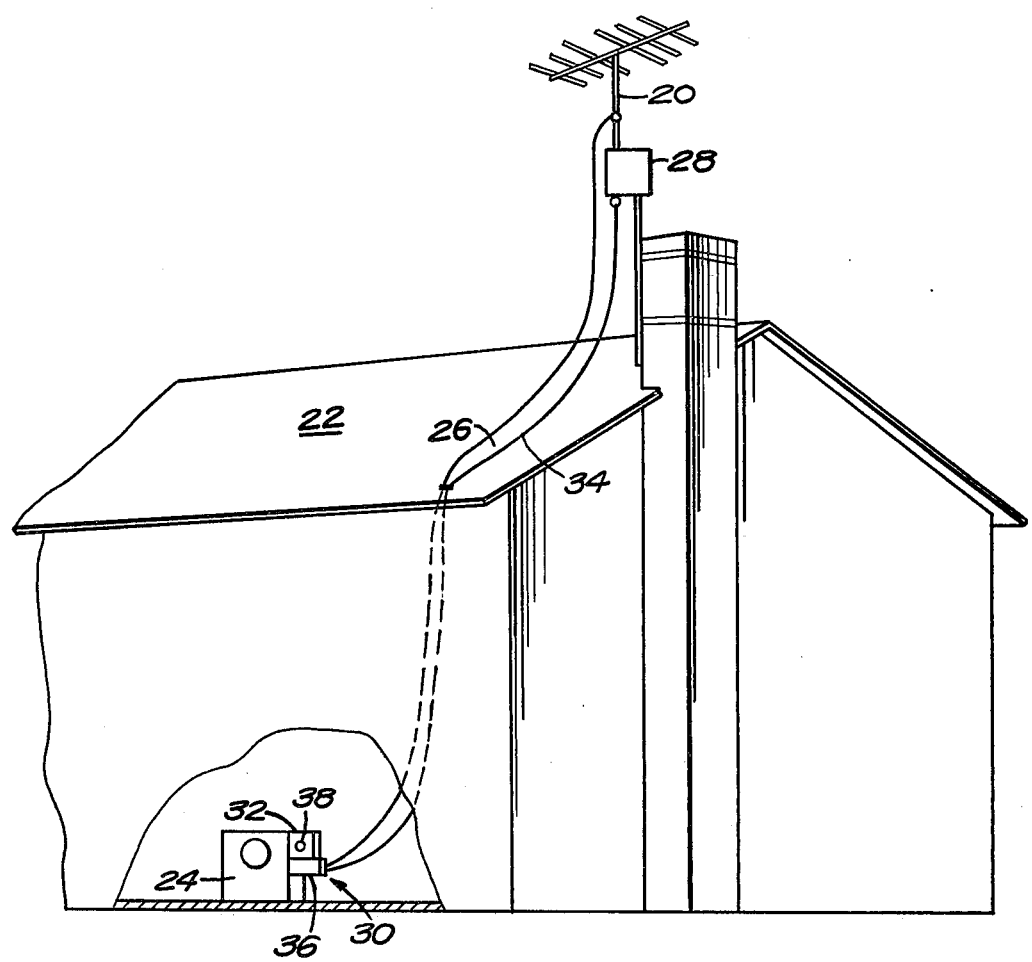
FIG. 1 is a stylized view of an antenna mounted on a roof with the orientation selected by a control circuit having a control panel located adjacent a television receiver.

Referring now to FIG. 1, there is shown an antenna 20 mounted on a roof 22 of a home containing a television 24. Transmission line 26 conveys the television signal from the antenna 20 to the television 24. The antenna 20 is understood to be a directional antenna. In order to orient the antenna 20 for best reception of a television signal, the antenna 20 is connected to the roof by a rotator 28 which both supports and orients the antenna 20. A drive circuit 30 operates the rotator 28, the circuit 30 including a control panel 32 which is conveniently mounted adjacent the television 24. Thereby, a person using the television 24 can command a specific orientation of the antenna 20. A cable 34 having five conductors therein, in accordance with the present industry standard, connects the rotator 28 with a circuit module 36 at the panel 32. As will now be described, the circuit module 36 is responsive to a feedback signal from the rotator 28 for applying power to operate the rotator 28. The module 36 applies the power in accordance with a commanded orientation of the antenna 20 as designated by an exemplary knob 38 on the panel 32.

Figure 2:
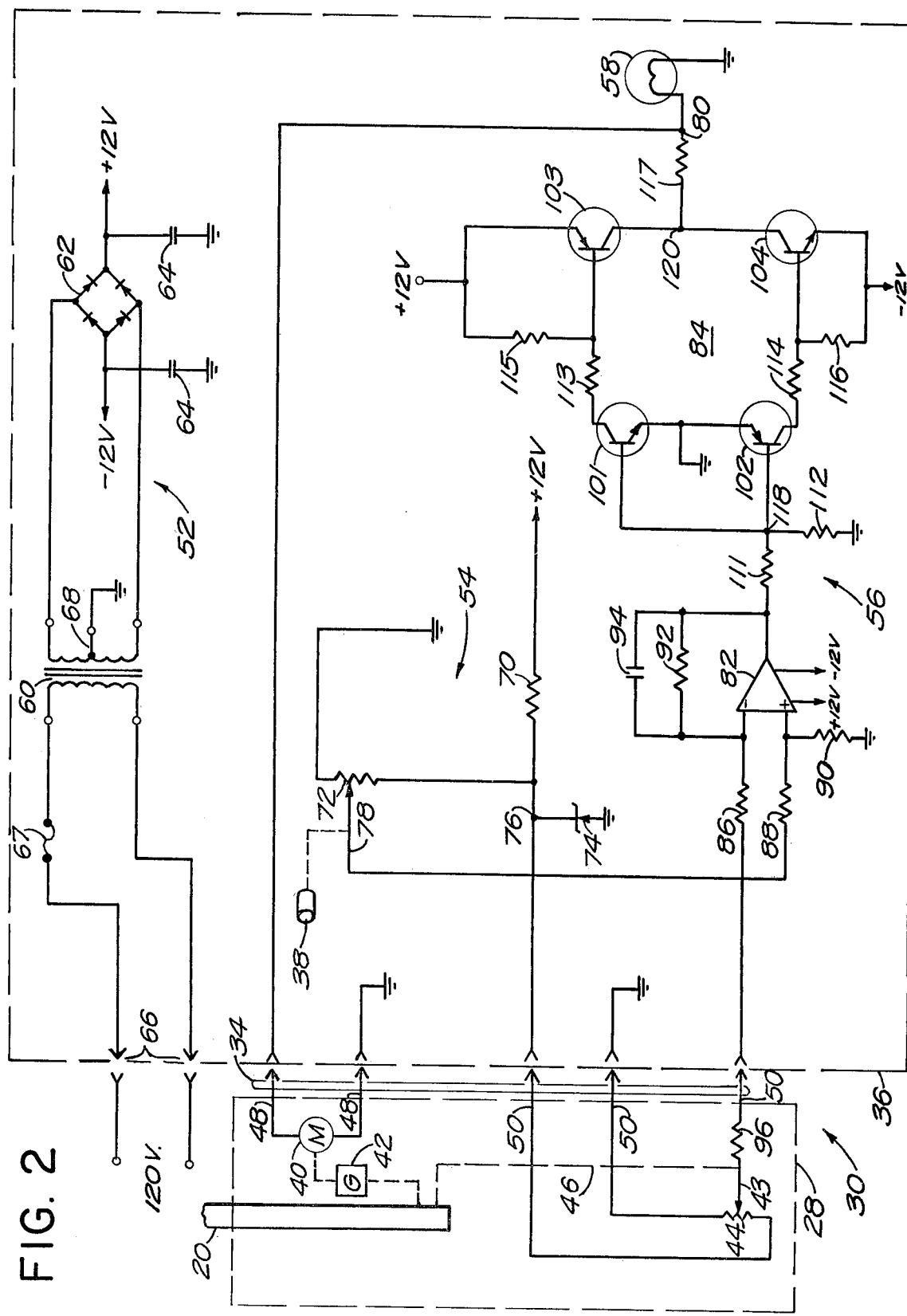
FIG. 2 is a schematic diagram of the control circuit for the rotator in accordance with the invention.

Referring also to FIG. 2, the drive circuit 30 is shown in greater detail. The rotator 28, the circuit module 36, and their coupling by the cable 34 are also shown in FIG. 2. The rotator 28 comprises a motor 40 mechanically coupled via gear train 42 to the antenna mast 20. A potentiometer 44 serves as the position sensor of the antenna mast 20, and is mechanically coupled thereto as indicated by line 46. Rotation of the antenna mast 20 produces a corresponding movement in the arm of the potentiometer 44 so that the output voltage of the potentiometer is a measure of the antenna orientation.

In accordance with the invention, the motor 40 is a DC motor utilizing brushes and having a pair of leads 48 by which electric power is coupled to the motor 40.

In the preferred embodiment of the present invention a 12 volt DC motor is used having a size corresponding to approximately 0.02 horsepower. The motor is selected for the amount of torque it can generate and for its speed characteristics. Typically, a selected motor should have a stall torque of approximately 3.5 inch-ounces, and be capable of rotating a given antenna 360 degrees in approximately 60 seconds. When used with the gear ratio of 4000:1 of the present invention, this translates into the requirement that a selected motor be capable of running at 4000 r.p.m. at a torque of 0.1 inch-ounces. One example of a motor meeting these specifications is the motor model number 6072-400 manufactured by Allegretti-Rowe.

Potentiometer 44 is provided with three leads 50 for connection with the module 36. A reference voltage is impressed across the outer terminals of the potentiometer 44 by the leads 50. A voltage at the wiper arm representing antenna orientation is obtained via a lead 50. The total of the two leads 48 and the three leads 50 is numerically equal to the total of the five conductors of the cable 34. Also, in accordance with an important feature of the invention, one of the leads 48 serves as a ground return for the motor 40, and another one of the leads 50 serves as a ground return for the potentiometer 44 to provide separate grounding of the potentiometer 44 and the motor 40 by two separate conductors of the cable 34. This arrangement allows the grounding circuit of the motor 40 to be isolated from the grounding circuit of the potentiometer 44 for improved operation of the circuit module 36.

The circuit module 36 comprises a power supply 52 for providing low voltage power to the circuit components of the module 36, a voltage source 54 for supplying a reference voltage to the potentiometers 44 and 72, a circuit 56 responsive to the difference between antenna orientation and command signals for generating a motor drive signal, and an indicator 58 which is responsive to the magnitude of the motor drive current indicating proper or improper movement of the rotator motor 40.

The power supply 52 is of standard design comprising a transformer 60, a diode bridge 62 and capacitors 64 for converting the house voltage, typically 120 volts AC to a relatively low voltage of ±12 volts DC. The 12 volts is sufficiently high to drive the motor while being sufficiently low to offer a substantial increase in safety for use in the home where children may have access to the control panel 32. The input winding of the transformer 60 is connected to an input terminal pair 66 of the module 36 through which connection is made to the house current. Advantageously, a safety fuse 67 is provided between transformer 60 and the terminal pair 66. As an alternative to safety fuse 60 and as here preferably embodied, as is well known in the art, a suitable thermal cut-off device may be incorporated in the coils of transformer 60, which operates to open the circuit upon sensing a temperature over a predetermined limit.

The capacitors 64 are coupled from opposite corners of the bridge 62 to ground. The output winding of the transformer 60 is coupled across the diode bridge 62 and includes a center tap 68 which is grounded to provide symetrical voltage levels of +12 volts and −12 volts across respective ones of the capacitors 64. The capacitors 64 serve as filters in the well known rectification action of the circuit of the bridge 62 to provide a relatively smooth DC voltage substantially free of AC ripple. Both the ±12 volts and the −12 volts are utilized in driving the transistor circuit described below.

A reference voltage source 54 is provided, it being connected through a series resistor 70 to one side of potentiometer 72, and to one side of potentiometer 44 (located in rotator 28) through lead 50 thereof via a conductor of the cable 34. The other side of potentiometer 72 is connected to ground, as is the other side of potentiometer 44 through the other lead 50 thereof via a second conductor of the cable 34. Thus, potentiometers 72 and 44 are arranged such that each potentiometer in effect constitutes one branch of a Wheatstone Bridge.

Reference voltage 54 is further stabilized by a zener diode 74 which has its cathode terminal 76 connected to the junction of resistor 70 and potentiometer 72 and its anode terminal connected to ground. Diode 74 causes a fixed reference voltage, independent of power line fluctuations and no-load/full-load regulation ripple at the capacitors 64, to appear across iteself, and thus across potentiometers 72 and 44.

Arm 78 of potentiometer 72 selects a fraction of the reference voltage, the magnitude of the fraction being determined by the position of arm 78. The position of arm 78 is, in turn, controlled through knob 38 which is mechanically coupled to it. By turning knob 38 one is able to select various fractions of the reference voltage, thereby generating various antenna positioning command signals.

Since the reference voltage provided by diode 74 also appears across potentiometer 44, potentiometer 44 uses this same reference voltage to provide an accurate indication of the actual antenna orientation. This orientation signal is provided by the wiper arm 43 of potentiometer 44 referencing various fractions of the reference voltage, depending upon the actual position of the antenna.

Thus, in accordance with the Wheatstone Bridge arrangement of potentiometers 72 and 44, there is provided a feedback signal which indicates to the control circuit the difference between the actual antenna position and the new position which is selected. This occurs when the wiper arms 43 and 78 of the potentiometers 44 and 72, respectively, indicate that there is a difference between that fraction of the reference voltage selected by the wiper arm 78 of potentiometer 72 and that fraction of the reference voltage referenced by the wiper arm 43 of potentiometer 44.

In the preferred embodiment of the invention, the reference voltage at terminal 76 of diode 74 has a nominal value of 3.9 volts.

As noted above, the motor 40 is driven by a signal generated by the circuit 56. The motor drive signal appears at terminal 80 which is an input terminal to the indicator 58. Terminal 80 is coupled via a conductor of the cable 34 to a lead 48 of the motor 40 in the rotator 28. The other lead 48 of the motor 40 is also connected via a conductor of the cable 34 to be grounded at the circuit module 36. The voltage for driving the motor 40 is applied between the terminal 80 and ground. The voltage at terminal 80, as will be described subsequently, may have either a positive polarity or a negative polarity, the positive voltage driving the motor in a clockwise rotation while the negative voltage drives the motor in a counterclockwise rotation.

The drive-signal generating circuit 56 comprises an operational amplifier 82, configured as a difference amplifier, and a power amplifier 84. The operational amplifier 82 has a differential input circuit, thereby allowing it to measure the voltage differences between the wiper arms of potentiometers 72 and 44. Depending upon the polarity of this measurement, operational amplifier 82, which has a gain of approximately sixty-five in the preferred embodiment, will cause either a positive or negative drive signal to occur at terminal 80. The power amplifier 84 is coupled between the operational amplifier 82 and the terminal 80 to provide the requisite current for driving the motor 40.

The circuit of the operational amplifier 82 includes resistors 86, 88, 90 and 92, and a capacitor 94. The resistor 92 and the capacitor 94 are connected in parallel between the output terminal and the negative input terminal of the amplifier 82 to provide negative feedback, the capacitor 94 and the resistor 92 providing a low pass filter function to the operation of the amplifier 82. The resistor 86 is coupled between the negative input terminal of the amplifier 82 and the wiper arm 43 of potentiometer 44, the coupling being accomplished with the aid of a second resistor 96 located at the opposite end of the cable 34 and connected in series with the resistor 86. The presence of the additional resistor 96 in combination with the inherent capacitance of the cable 34 aids in the filtering of electrical noise which may be present in the rotator 28. In addition, the resistor 96 protects the circuit, particularly the potentiometer 44, from excessive current in the event that the conductors of the cable 34 are inadvertently misconnected during installation. The resistor 88 is coupled between the positive input terminal of the amplifier 82 and the wiper arm 78 of the potentiometer 72. Thereby, the voltage of the orientation command signal is coupled by the resistor 88 to the positive input terminal of the amplifier 82 while the voltage representing the orientation of the antenna mast 20, as sent by the potentiometer 44, is coupled via the resistors 86 and 96 to the negative input terminal of the amplifier 82. The positive input terminal of the amplifier 82 is also connected by the resistor 90 to ground, as is the common practice in the use of operational amplifiers. In constructing amplifier in a differential input mode 82 any conventional operational amplifier, such as a uA 741, may be used.

The power amplifier 84 comprises a pair of input transistors 101–102, a pair of output power transistors 103–104, and a set of seven resistors 111–117. The transistors 101 and 104 are of the NPN type and the transistors 102 and 103 are of the PNP type. The base terminals of the transistors 101-102 are connected together at terminal 118. Terminal 118 is connected to the output terminal of the amplifier 82 by means of the resistors 111-112 which are serially connected between ground and the output terminal of the amplifier 82, the terminal 118 being at the junction of the resistors 111-112. The series combination of resistors 111-112 is a voltage divider which provides a suitable source impedance for transistors 101 and 102. The base current for transistors 101 and 102, which operate in complimentary symmetry in response to positive and negative voltage swings at the output of operational amplifier 82, is provided by operational amplifier 82 through resistor 111. Transistors 101 and 102, in turn, operating in conjunction with resistors 113 and 114, provide the requisite base current to drive transistors 103 and 104, respectively, into saturation to allow them to provide the necessary drive current for motor 40. Thus, transistors 103 and 104 are operated between cut-off and saturation in complimentary symmetry, with the collector of transistor 103 switching on to and a voltage close to the +12 volt supply level, and with the collector of transistor 104 switching on to and a voltage close to the −12 volt supply level. Depending upon whether motor 40 is to be driven clockwise or counter-clockwise, transistor 103 or transistor 104, respectively, is driven into saturation to provide either a positive or negative drive voltage at terminal 80 and, thus, across motor 40.

It will be understood that transistors 103 and 104 are to be selected so that they are able to handle the current necessary to drive the particular motor 40 which is selected. For example, it has been been found that highly satisfactory results are achieved utilizing model numbers TIP32 and TIP31, respectively, for transistors 103 and 104 and model numbers 2N2222 and 2N2907 for transistors 101 and 102, respectively.

Continuing with the description of the interconnection of the components of the power amplifier 84, the resistors 113 and 115 are serially connected between the collector terminal of the transistor 101 and the +12 v terminal of the supply 52. Similarly, the resistors 114 and 116 are serially connected between the collector terminal of the transistor 102 and the −12 v terminal of the supply 52. The emitter terminals of the transistors 101-102 are connected to ground. The collector terminal of the transistors 103-104 are connected together at terminal 120 which, in turn, is coupled by resistor 117 to the terminal 80. The emitter terminals of the transistors 103-104 are coupled, respectively, to the +12 v and the −12 v terminals of the supply 52.

Typical values of resistance, as utilized in the preferred embodiment of the invention, are as follows: The resistors 115-116 each have a value of 1000 ohms while the resistors 113-114 each have a value of 150 ohms. The resistors 111-112 each have a value of 2200 ohms. The resistor 117 has a value of 7.5 ohms. In the circuit of the amplifier 82, the resistor 88 has a value of 4700 ohms while the series combination of the resistors 96 and 86 is approximately equal thereto, the resistor 96 having a value of 1000 ohms while the resistor 86 has a value of 3900 ohms. The resistor 92 has a value of 330,000 ohms and the capacitor 94 has a value of 0.01 microfarads.

In operation, therefore, the operational amplifier 82 is responsive to the difference between the commanded antenna orientation, as provided by the potentiometer 72, and the sensed antenna orientation, as provided by the potentiometer 44. The amplitude and polarity of the signal at the output terminal of the amplifier 82 is dependent upon the relative magnitude of the commanded and sensed orientation signals. The polarity of the output signal of the amplifier 82 is preserved by the amplifier 84 while the power of the output signal of the amplifier 82 is increased by the amplifier 84 to a suitable value for driving the motor 40. Upon energization of the motor 40 by the signal at terminal 80, the motor rotates and, by the gear train 42, imparts rotation to the antenna 20. Since the arm 43 of the potentiometer 44 is mechanically coupled to the rotating antenna 20, the voltage transmitted by the potentiometer 44 to the amplifier 82 rises or falls in proportion to the rotation of the antenna 20. Thus, the configuration of the circuit of FIG. 2 is a feedback loop wherein the sensed antenna orientation is fed back commensurate with the rotation of the antenna mast 20, said rotation being induced by the output signal of the operational amplifier 82. The loop bandwidth and stability is provided by the filtering action of the capacitor 94 and the resistor 92. Due to the scaling of the frictional forces by the gear train 42 as well as the scaling of the rotational inertia of the antenna 20 by the gear train 42, a step-down gear ratio of 4000:1 being utilized in the preferred embodiment of the invention, both the frictional forces and the inertia associated with the antenna 20 may be viewed as being negligibly small compared to that of the motor 40. Thus, the selection of the loop bandwidth and gain can be accomplished with well known design procedures for feedback loops. In addition, the frictional forces of the motor 40, as presented to the antenna 20, are magnified by the gear ratio to a sufficiently high value such that no rotation of the antenna 20 can occur due to wind forces when the motor 40 is de-energized. Thus, the dynamic response of the loop is not required to compensate for wind forces on the antenna 20, but may be chosen on the basis of the speed with which it is desired to reposition the antenna 20.

In accordance with the invention, and as preferably embodied, control circuit 30 includes an indicator lamp 58, which provides an indication as to the operational status of motor 40. Indicator lamp 58 has a filament which glows in response to the amplitude of the voltage at terminal 80. Thus, when the control circuit senses a discrepancy between the commanded and sensed orientation of antenna 20 such that motor 40 begins to turn under normal run conditions, the voltage at terminal 80 will be within one volt of the nominal plus or minus 12 volt value of the positive or negative voltage supply, depending upon the direction of motor 40's rotation, causing indicator 58 to glow brightly. This voltage is close to the supply voltage because the current demand of motor 40 is small, causing a negligible voltage drop across resistor 117, which has a value of about 7.5 ohms in the preferred embodiment of the invention. Once the antenna reaches the position commanded, the voltage at terminal 80 will drop to zero, causing indicator 58 to become extinguished. This occurs because either transistor 103 or 104, depending upon the direction of motor rotation being used, switches to its cut-off state.

In contrast, if motor 40 is incapable of turning in response to a rotation command because of a reason such as the antenna being jammed by ice, then indicator 58 will be dim in intensity since the current demanded by stalled motor 40 increases, causing the voltage at terminal 80 to drop lower due to a greater voltage drop across resistor 117.

Indicator 58 is also useful for detecting ground shorts in the motor circuit under conditions where a rotation command has been given. Here the current drawn by the motor will increase significantly, causing a substantial voltage drop across resistor 117, with either a negligible or no voltage drop across the motor windings. Since resistor 117 bears such a substantial voltage drop across itself, the voltage seen at terminal 80 will be either zero or negligible, causing indicator 58 to be extinguished.

With respect to the grounding of one terminal of the potentiometer 44 and one terminal of the motor 40 of the rotator 28, separate conductors of the cable 34 are coupled to the terminals which are to be grounded, the terminals being grounded in the circuit module 36. Thus, the presence of any noise in the leads of the motor 40 is maintained separate from the signals on the leads 50 of the potentiometer 44. As a result, the brush noise of the motor 40 is isolated from the relatively low powered signals at the input terminals of the operational amplifier 82 so as to insure unimpeded operation of the amplifier 82. The physical size of the circuit module 36 is sufficiently small, on the order of a few inches or less, such that the physical extent of ground current in the module 36 is too small for any significant coupling between the high-powered current of the motor circuit and the relatively low-powered currents in the circuit of the operational amplifier 82. The resistor 117, in series with the windings of the motor 40, dissipating power in the event of a motor stall, thereby prevents burnout under conditions of stall. Thus, the foregoing circuitry provides accurate control of the antenna orientation, while insuring safety in the operation of the device, as well as conformance to the industry interconnection standards.

It will be understood from the foregoing that the circuitry and apparatus of the present invention is highly advantageous for use in the rotation of antennas in that the circuitry protects the motor against burnout even under stall conditions. Also, the arrangement of the motor windings with respect to the circuit components permits fail-safe connection of the motor, such that no damage occurs to the motor in the event of miswiring or terminal shorting during installation. In addition, the indicator light serves a diagnostic function in that stall conditions of the rotator are detectable by greatly reduced lamp brilliance.

It is to be understood that the above-described embodiment of the invention is illustrative only and that modifications thereof may occur to those skilled in the art. For example, although the foregoing specific values and/or commercial model designations for amplifiers, amplifier gain, transistors, voltages and resistance values have been found to produce highly satisfactory results and are given as an example of the preferred mode of carrying out the invention, other equivalent components and operating values will be apparent to those skilled in the art.

The invention in its broader aspects, therefore, is not limited to the specific embodiment herein shown and described, but departures may be made therefrom within the scope of the accompanying claims, without departing from the principles of the invention and without sacrificing its chief advantages.

What is claimed is:

1. An apparatus for driving an antenna rotator comprising:
   (a) a circuit comprising:
      (1) means for sensing the orientation of an antenna,
      (2) means for commanding an orientation of said antenna,
      (3) means for generating a drive signal, said generating means being responsive to a difference between a command signal of said commanding means and an orientation signal of said sensing means,
      (4) a D.C. motor for rotating said antenna to a desired orientation as commanded by said commanding means, said motor being driven either clockwise or counterclockwise by said drive signal of said generating means to achieve said desired orientation,
      (5) a multiple-conductor cable connecting said motor and said sensing means with said generating means, one conductor of said cable serving as a separate electrical ground return for said motor, and a second conductor of said cable serving as a separate electrical ground return for said sensing means for decoupling input and output terminals of said generating means, thereby insuring stable operation of said generating means; and
      (6) an indicator means coupled to said generating means for indicating the movement or non-movement of said motor in response to said drive signal, said indicator means being illuminated during the clockwise and counterclockwise movement of said motor and extinguished during the non-movement of said motor; and
   (b) a reduction gear train connecting said motor to said antenna, frictional forces of said motor and said gear train being scaled by a large gear ratio so as to prevent movement of said antenna when said motor is de-energized while permitting facile rotation of said antenna by said motor, said sensing means and said motor being located adjacent said antenna and distant from said generating means.

2. An apparatus according to claim 1 wherein the sum of the number of terminals of said motor connected to said cable, plus the number of terminals of said sensing means connected to said cable, is equal to five.

3. An apparatus according to claim 1 wherein said drive signal is characterized by a sense of rotation and an amplitude dependent upon said difference between said command and said orientation signals, the coupling of said sensing means in said circuit providing a feedback loop, said generating means including a low pass filter for stability of said feedback loop.

4. An apparatus according to claim 3 wherein said motor is responsive to the sense of said drive signal for rotating clockwise and counterclockwise in accordance with said sense.

5. An apparatus according to claim 1 wherein said indicator means is brightly illuminated when said motor is running, and dimly illuminated when said motor is stalled.

6. An apparatus according to claim 1 wherein said gear ratio is at least 1000:1.

7. An apparatus according to claim 1 wherein said gear ratio is 4000:1.

* * * * *